(12) United States Patent
Taylor et al.

(10) Patent No.: US 8,608,223 B2
(45) Date of Patent: Dec. 17, 2013

(54) AUTOMOBILE COVER REMOVAL AND INSTALLATION ROLLER ASSEMBLY

(75) Inventors: Don M. Taylor, Wadsworth, OH (US); James N. Filippi, Wadsworth, OH (US)

(73) Assignee: Cruisin' Solutions, Wadsworth, OH (US)

( * ) Notice: Subject to any disclaimer, the term of this patent is extended or adjusted under 35 U.S.C. 154(b) by 67 days.

(21) Appl. No.: 13/401,245

(22) Filed: Feb. 21, 2012

(65) Prior Publication Data

US 2013/0214554 A1     Aug. 22, 2013

(51) Int. Cl.
*B60J 11/02*        (2006.01)

(52) U.S. Cl.
USPC ........................................ 296/98; 296/136.01

(58) Field of Classification Search
USPC ................... 296/98, 136.01, 136.1; 150/166; 160/370.22; 242/395, 395.1, 407.1, 242/407
See application file for complete search history.

(56) References Cited

U.S. PATENT DOCUMENTS

| | | |
|---|---|---|
| 2,751,977 A | 6/1956 | Pinkerton |
| 3,021,894 A * | 2/1962 | La Due ........................ 160/23.1 |
| 4,459,711 A | 7/1984 | Sartain et al. |
| 4,467,978 A | 8/1984 | Farrington |
| 4,732,421 A | 3/1988 | Ross et al. |
| 4,848,823 A | 7/1989 | Flohr et al. |
| 4,856,842 A | 8/1989 | Ross et al. |
| 5,086,988 A | 2/1992 | LaPoint et al. |
| 5,597,196 A | 1/1997 | Gibbs |
| 6,964,446 B2 | 11/2005 | Porter |
| 7,213,868 B1 | 5/2007 | Tan |
| 7,464,982 B1 | 12/2008 | Lin et al. |
| 2004/0000798 A1 * | 1/2004 | Royer ............................. 296/98 |

FOREIGN PATENT DOCUMENTS

| | | | |
|---|---|---|---|
| EP | 2426310 A1 * | 3/2012 | |
| JP | 06064448 A | 3/1994 | |

* cited by examiner

*Primary Examiner* — Jason S Morrow
(74) *Attorney, Agent, or Firm* — Hudak, Shunk & Farine Co. LPA

(57) ABSTRACT

A cover removal and installation roller assembly for an automobile that is particularly suited to be operated by hand, by an individual, in order to install or remove a cover from the automobile. The roller assembly includes a self-storing hand crank that is removably connectable to a cover spool whereby the cover spool can be rotated in order to wind the cover therearound or play the cover out from the spool. The cover in one embodiment is removably connectable to the cover spool. Methods for using the cover roller and installation roller assembly.

15 Claims, 2 Drawing Sheets

AUTOMOBILE COVER REMOVAL AND INSTALLATION ROLLER ASSEMBLY

FIELD OF THE INVENTION

The present invention relates to a cover roller assembly for an automobile that is particularly suited to be operated by hand, by an individual, in order to install or remove a cover from the automobile. The roller assembly includes a self-storing hand crank that is removably connectable to a cover spool whereby the cover spool can be rotated in order to wind the cover therearound or play the cover out from the spool. The cover in one embodiment is removably connectable to the cover spool. Methods for using the cover removal and installation roller assembly are disclosed.

BACKGROUND OF THE INVENTION

Various automobile, vehicle or car covers have been designed and used to protect automobiles, whether they are parked in a garage or other structure or outdoors and exposed to the elements. Such covers are useful to provide temporary protection from one or more of natural elements such as rain and snow; sunlight, dust, tree sap, bird droppings and the like. The prior art covers have been offered in a variety of configurations and have been aimed at specific models of a vehicle and also in generic versions. Covers have been designed to cover automobiles or vehicles completely as well as cover only a portion of the automobile such as a hood, roof, or trunk as well.

U.S. Pat. No. 2,751,977 relates to a one man automobile cover and has for an object to provide, in combination with a flexible cover for an automobile, a device to reportedly enable the cover to be easily and quickly placed over the automobile and quickly and easily removed therefrom and folded into a small bundle, all by a single person working from one side only of the vehicle.

U.S. Pat. No. 4,732,421 relates to a reportedly self-storing, retractable automobile cover apparatus that includes a pair of end plates joined in spaced apart disposition by a plurality of rigid tubes. The apparatus is removably secured to one bumper of the auto, and the free end of the deployed cover is releasably hooked to the other bumper. When the hooks are released, the spring tension causes the tubular reel to rotate and wind the cover thereabout, the cover passing through the fixed guides to control the takeup of the cover onto the tubular reel.

U.S. Pat. No. 4,848,823 relates to a remotely controlled power-assisted vehicle cover attached to a take-up spool winding and unwinding mechanism which is housed in an eccentric-shaped containment tube, mounted under the front or back bumper areas of a vehicle. The vehicle cover is extracted from the cylindrical cover containment tube and placed over a vehicle by a wand fastened to the leading edge of the vehicle cover and houses a wireless control system including a remote motor control and a transmitter to send: on/off, single or variable speed, and reversing controls to the drive motor of the cover extracting/retracting mechanism. In addition to controlling the cover drive motor, the control wand is used to physically guide the protective cover on or off the vehicle.

U.S. Pat. No. 4,856,842 relates to a self-storing, retractable automobile cover apparatus includes a pair of end plates joined in spaced apart disposition by a plurality of rigid tubes. The apparatus is removably secured to one bumper of the auto, and the free end of the deployed cover is extendable to the other bumper. To retract the car cover, the motor is actuated by a switch connected thereto and disposed at the free end of the car cover to rotate and wind the cover about the tubular reel, the cover passing through the fixed guides to reportedly control the takeup of the cover onto the tubular reel.

U.S. Pat. No. 5,086,988 relates to a car cover storage device reportedly for allowing easy, quick and convenient storage of a car cover. The car cover storage device of the present invention comprises a container having an opening with an axle disposed within. The axle is rotated by applying pressure on a handle which is connected to the axle. As the handle is rotated, the car cover is retracted through the opening to wrap around the axle. The car cover storage device reportedly eliminates awkward folding and unfolding of the car cover and allows the car cover to be conveniently stored in the trunk of the car or in some location remote from the car.

U.S. Pat. No. 5,597,196 relates to a system for the deploying and storing of an automobile cover. The cover having one end adapted to covering and being secured to the end of the automobile opposite from the trunk, and the other end attached to the roller. The operator can deploy the cover by pulling it from the back of the trunk over the trunk lid, and over the car, securing it to front bumper. The trunk can be closed after the cover is secured to the front bumper, thus securing the system inside the trunk.

U.S. Pat. No. 6,964,446 relates to a retractable vehicle cover apparatus for covering a vehicle comprising an elongated, hollow housing, and axle disposed therein for rotation about a central axis, and an elongated cover having a proximal end coupled with the axle and also having a distal end.

U.S. Pat. No. 7,213,868 relates to a reportedly protective automobile cover apparatus that can be conveniently deployed or stored by one person in approximately one minute. It includes two containers with a flexible cover sheet stowed in the first container in a free-folded form. The first container has a length similar to the width of the opening of the trunk and is stored in the second container in its storage position. In its operative position, the first container rests on the rear bumper and is anchored relative to the vehicle by straps caught by the second container which is secured inside the trunk compartment of the automobile. The user grasps a handle element to extract and display the cover sheet from the first container without the need of unfolding the cover. The user can also reportedly uncover the automobile and stuff the cover sheet into the first container, without the need of compactly folding the cover.

U.S. Pat. No. 7,464,982 relates to a vehicle cover device having a housing integral with an axle having a folding crank handle to utilize a reeling action useful in the withdrawing and retracting of a folding cover comprised of a sheet like material that when withdrawn can be expanded to cover a vehicles body by manipulation of an end rod attached to said folding covers end portion that is pulled through the jam of a trunk and over a vehicles forward body to effectively protect said vehicle.

Japanese Abstract 06064448 relates to a device that reportedly works as covering a car body with a car body cover and uncovering of the car body cover to be reportedly done in a short time without assistance by providing two rotary type roller bars at the front section of a roll.

In view of the above, a problem of the invention is to design a cover assembly for an automobile that is effective in aiding in the installation and removal of an automobile cover, provide a cover assembly that can be utilized by a single person, and yet further provide a cover assembly that is compact, and is easily storable when not in use. Additionally, a cover assembly should be provided that reduces or prevents bunching and/or balling of the cover.

SUMMARY OF THE INVENTION

Therefore, it is an object of the present invention to provide a cover roller assembly for an automobile or other vehicle that can be used to quickly and easily install a cover by a single individual.

Yet another object of the present invention is to provide a cover removal and installation roller assembly that can be easily and compactly stored when not in use.

An additional object of the present invention is to provide a cover removal and installation roller assembly with a hand crank having a self-storing portion, namely a handle assembly, the hand crank removably connectable to a cover spool.

Still another object of the present invention is to provide a hand crank with a handle assembly that can be stored in a portion of a body of the hand crank when not in used.

Accordingly in one aspect of the invention, an automobile cover roller assembly is disclosed, comprising a hand crank having a body operatively connectable to a cover spool, the hand crank having a jointed handle assembly moveable between a first, active position whereby the handle assembly can be utilized to rotate the cover spool in relation to a stabilizer support of the hand crank and a second, storage position wherein a portion of the handle assembly is stored inside the body.

Accordingly in another aspect of the invention, an automobile cover roller assembly is disclosed, comprising a cover spool having a segment adapted to be connected to a car cover and a connector member; and a hand crank having a connector member adapted to be connected to the cover spool connector member, the hand crank including a body and a handle assembly operatively connected to the body such that the handle assembly can be used to rotate the cover spool in relation to the body, the handle assembly including at least one hinged section moveable in relation to the body such that a portion of the handle assembly can be stored in the body when not in use.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
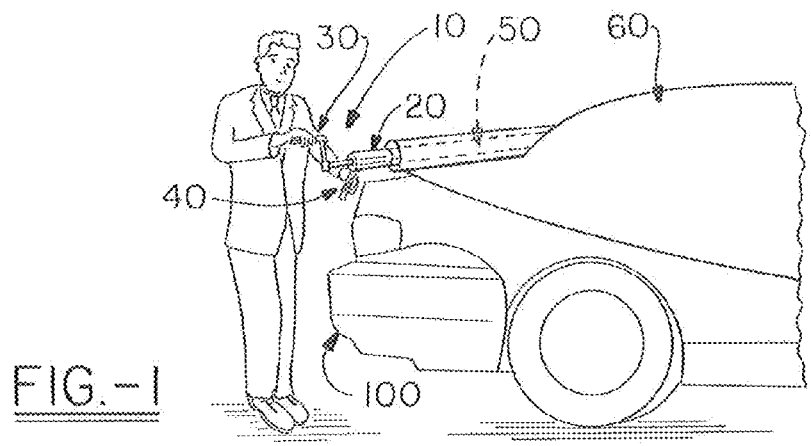
FIG. 1 is partial perspective view showing use of the automobile cover removal and installation roller assembly in use removing a cover from an automobile.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "down," "top" and "bottom" as well as derivatives thereof (e.g., "horizontally," "vertically", "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Referring now to the drawings, FIG. 1 illustrates one aspect of a manner of using the automobile cover roller assembly 10 of the present invention on an automobile 100. The cover roller assembly 10 can be used to install a cover 60 on and/or remove a cover 60 from the automobile by a single individual or person, conveniently and quickly. The cover roller assembly 10 allows a cover 60 to be stored in a rolled state on a cover spool 50 at a desired location, for example in a garage or the trunk of the automobile 100.

Figure 2:
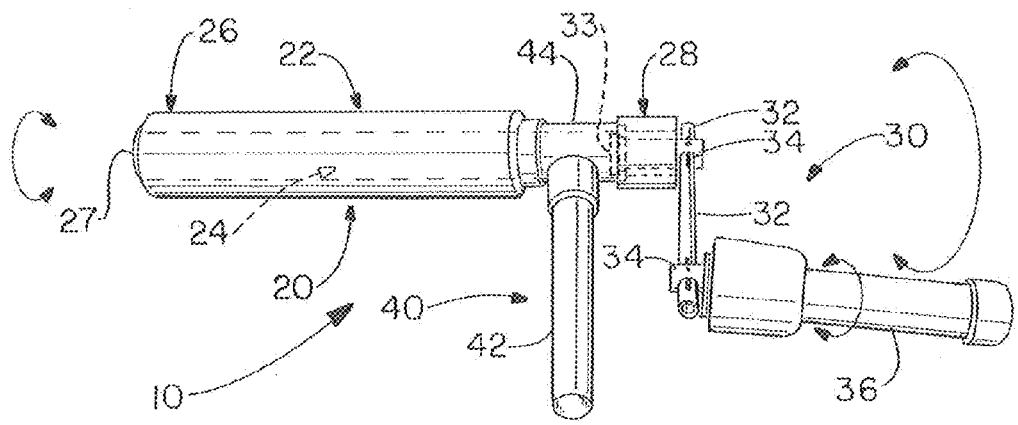
FIG. 2 is a side perspective view illustrating the cover roller assembly including a hand crank having a handle assembly in an in-use position.
Figure 3:
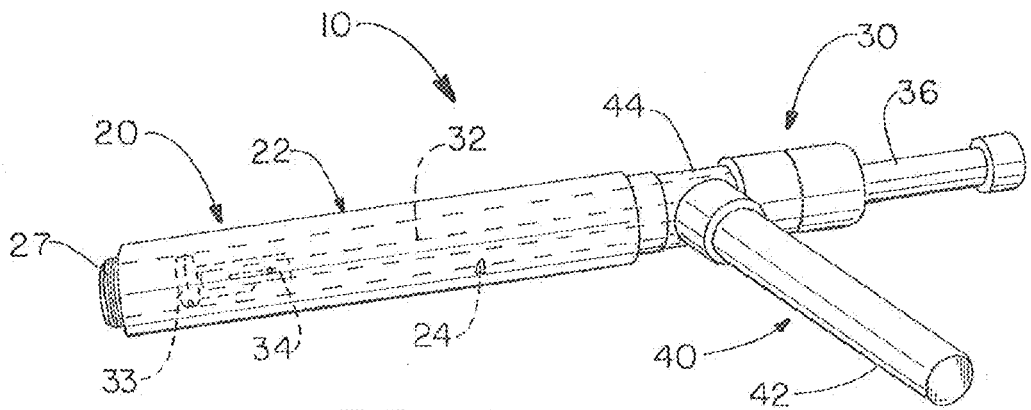
FIG. 3 is an elevational perspective view illustrating the hand crank handle assembly in a storage position with a portion of the handle extending into the hand crank body.
Figure 4:
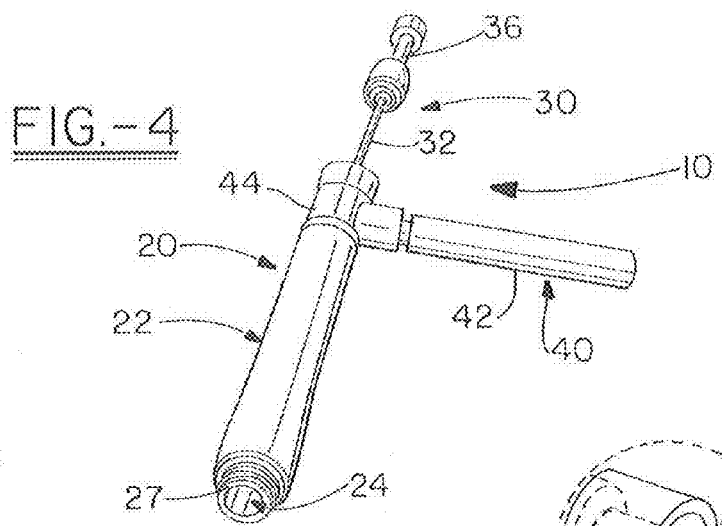
FIG. 4 is a elevational end view illustrating one embodiment of a hand crank of the present invention wherein the handle has been withdrawn from a portion of the body but not yet manipulated into an in-use position.
Figures 5, 8:
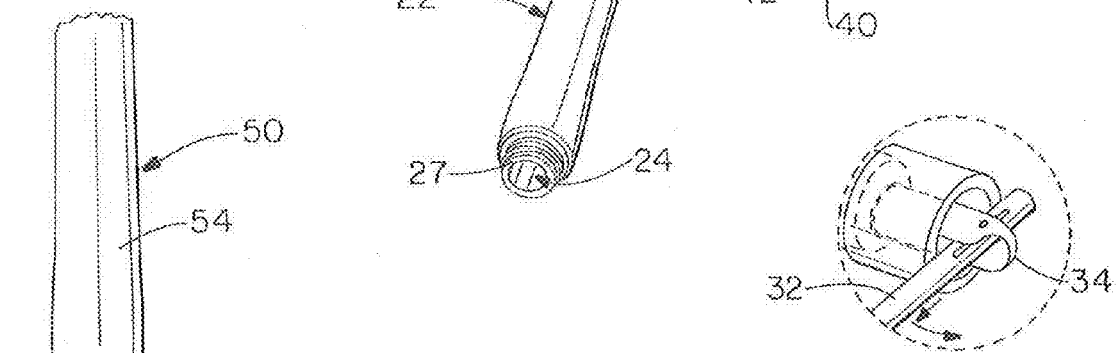
FIG. 5 is an end perspective view of one embodiment of a cover spool of the present invention particularly illustrating a connector member at one end thereof adapted to be connected to a hand crank.
FIG. 8 is an exploded view of the area indicated in FIG. 7 particularly illustrating the slot and pin configuration between adjacent handle segments of the handle assembly.
Figure 7:
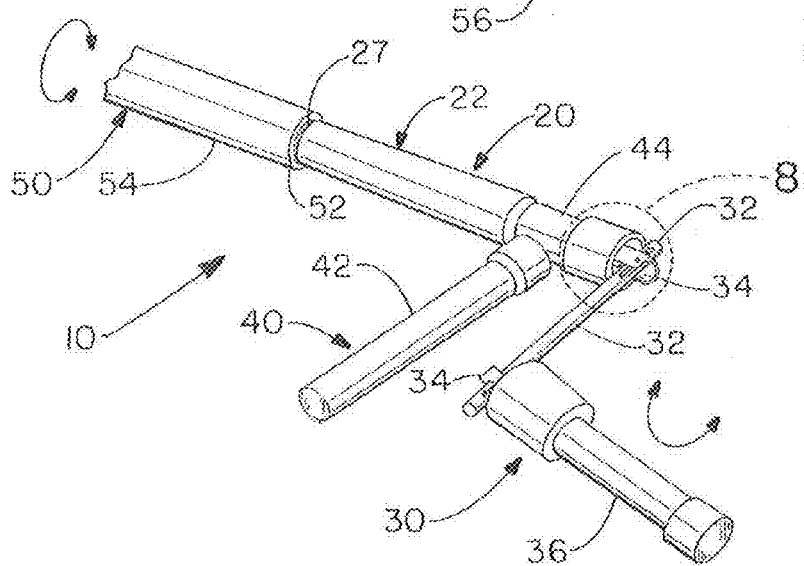
FIG. 7 is a perspective view of one embodiment of a hand crank connected to a cover spool, wherein the handle of the hand crank is portrayed in an active, in-use position.

The hand crank 20, as the name implies is adapted to be hand-operated by a user. In other embodiments, the cover roller assembly can be manipulated by a power device. The hand crank 20 is an assembly of components that manipulate the cover spool 50 as desired. In a preferred embodiment, the hand crank 20 is a single unit or device comprising interconnected parts. The hand crank generally can be moved between an extended, in-use configuration or active position, see FIG. 2, and a retracted, storage configuration or inactive position, see FIG. 3, with additional configurations possible therebetween, see FIG. 4, for example. The hand crank 20 has a main body 22 that has a cavity or hollow portion 24, see FIG. 4 that, when desired, houses or stores a portion of the handle assembly 30. The body 20 has a first end 26 having a connector member 27 removably connectable to a connector member 52 of cover spool 40. The connector member 27 illustrated in FIGS. 3 and 4 is a male connector including a threaded exterior portion. Connector member 52 as illustrated in FIG. 5 is a female connector including internal threads which mate with the threads of connector member 27 as shown in FIG. 7.

The hand crank 20 also includes a stabilizer support 40 having a hand grip 42 at one end adapted to be held by a user during use such as shown in FIG. 1. At the other end of support 40, a support portal 44 is present that allows the handle 36 to rotate in relation to the stabilizer support 40 during winding or unwinding of the cover 60. In the embodiments illustrated, the portal 44 is a hollow segment having a section of the main body 22 passing therethrough and rotatable therein.

A second end 28 of the body 22 is located on an opposite side of the support portal 44 in relation to the first end. Generally, a portion of each end 26, 27 has a diameter greater than a diameter of the support portal 44 which prevents the body 22 from being unintentionally displaced from the support 40, yet rotatable in relation thereto. In one embodiment such as illustrated in the drawings, the support portal 44 is tubular and has an inner diameter that is slightly larger than the outer diameter of a portion of body 22 that extends through the support portal 44. The tubular portion of the body is rotatable in relation to the support portal 44.

As indicated hereinabove, in a storage position the handle assembly 30 includes handle segments 32 that are substantially stored in body 22. Also, the handle when having a generally linear form, such as shown in the drawings, is aligned with the longitudinal length of body 22 in the storage position, see FIG. 3. When it is desired to utilize the cover roller assembly, the handle 36 of handle assembly 30 is pulled outwardly and laterally away from body 22 of hand crank 20. At the handle assembly 30 opposite handle 36, a drive collar 33 is connected to an inner handle segment, with the drive collar 33 mating or otherwise operatively connecting with a portion of second end 28 of the main body 22 in order to prevent the handle assembly 30 from being completely withdrawn and thus separated from the body 22 and also allow the handle assembly 32 to rotate the body 22. Once the handle assembly 30 has been withdrawn sufficiently from body 22, such as shown in FIG. 4, the handle assembly 30 is manipulated to a useable position by folding handle segments 30 at the appropriate joints or hinges 34, generally at one angel that ranges from about 75° to 105° and preferably is about 90°. In one embodiment as illustrated in FIGS. 2, 7 and 8, the hinge 34 comprises a pin and slot arrangement wherein the central handle segment 32 includes a slot in which the pin of another handle segment 32 of hinge 34 is slidable. The inner and outer handle segments 32 also include an aperture 35 sized such that an end of intermediate handle segment 32 can extend therethrough in order to preferably situate adjoining the handle segments at generally right angles, for example see FIG. 2. FIG. 2 illustrates handle assembly 30 having two jointed or hinged segments, but it is to be understood that the invention is not limited thereto. Additional hinged segments or designs can be utilized so long as the handle assembly 30 can be utilized to manipulate the hand crank 20 in order to rotate cover spool 50.

In one embodiment, the handle assembly 30 is transformed to the in-use position as follows. In one embodiment handle 36 has a threaded end which is unscrewed from a corresponding threaded end such as second end 28 of body 22. The handle assembly 30 is pulled outwardly from body 22 and manipulated to lock the end of the handle assembly 30 containing drive collar 33 into the second end 28 of body 22. The hinge segments including hinges 34 are rotated generally 90 degrees and the ends of intermediate handle segment 32 are inserted into apertures 35 of the other handle segments, such as illustrated in FIG. 2.

Any portions of the hand crank can be provided with covers, designs, indicia or the like to furnish comfort to the user, advertising information or the like. For example, the grip portion of the handle 36 and the hand grip 42 of stabilizer support 40 can be provided with a foam or foam-like polymer cover to provide comfort to the user and protect vehicle surfaces. The hand crank 20 can be formed of any suitable materials in order to achieve goals such as low weight, high strength, and a ratio to achieve comfort and power.

In one embodiment the body 22 is formed from a polymeric material, such as but not limited to PVC. In one embodiment, the handle segments 32 are formed from a suitable metal along with hand grip 42 and handle 36. For durability purposes, the support portal is preferably formed from a metal.

The cover spool 50 includes a main shaft 54 which serves as a drum or axle about which the cover 60 is wound and/or unwound. The shaft 54 in one embodiment includes a soft covering such as foam in order to protect the finish of the vehicle.

Figure 6:
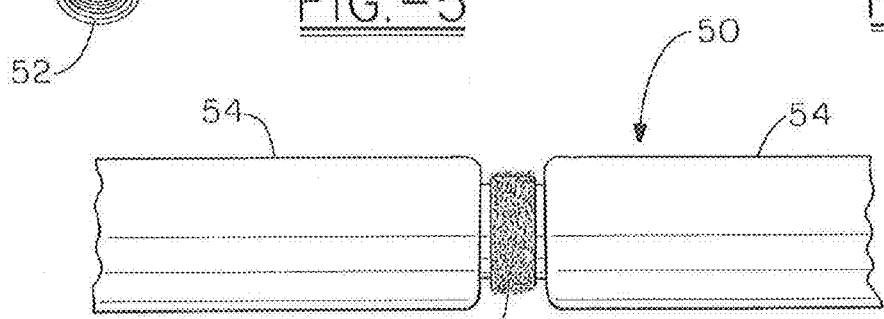
FIG. 6 is a partial side elevational view of one embodiment of a cover spool particularly illustrating one method of connection for a cover.

The purpose of shaft 54 is to allow the removable cover 60 to be wound and unwound therefrom. In a preferred embodiment, the shaft includes a fastener 56 such as Velcro®, snaps, buttons, or the like that allows cover 60 to be removably connected to the cover spool 50. One embodiment of a fastener 56, Velcro® is utilized as illustrated in FIG. 6. One or more fasteners can be utilized and located anywhere along the axial length of cover spool 50. In one embodiment, the fastener is located at a central location along the longitudinal length of the shaft 54, such as illustrated in FIG. 6. While the length of shaft 54 can vary, the length thereof is generally sufficient to hold a cover 60 of a suitable width. That said, the length of shaft 54 ranges generally from 1 about to about 10 feet, desirably from about 2 to about 8 feet and preferably from 4 about to about 7 feet. In a preferred embodiment, shaft 54 is of a rigid construction. Various polymers, metals, or the like can be utilized to form shaft 54. The shaft 54 can be covered, for example with a protective cover from any suitable material either manmade or natural, such as cloth, or a polymer such as foam-like polymer. As illustrated in FIG. 5, connector member 52 is included in one end of the cover spool 50 and is adapted to be connected to connector member 27 of hand crank 20.

The cover 60 can be formed of any suitable material(s). Covers generally include one or more layers configured to protect the automobile from the elements, or other signs of wear on the automobile or vehicle during usage of the cover and inhibits scratching. A cover can be formed of any suitable size in order to cover a desired vehicle.

The cover roller assembly is utilized in one embodiment as follows. If not in an in-use position already, the cover roller assembly is converted thereto such as described hereinabove. In order to remove a cover from a vehicle, a fastener present on the cover is connected to a fastener present on the cover spool of the cover roller assembly. For example a first of Velcro strip is made with a second Velcro strip to connect the cover to the cover spool. Thereafter, handle 36 is gripped with one hand by a user and the user's second hand generally grasps the handgrip of the stabilizer support. Handle 36 is then rotated in a clockwise or counter clockwise to wind the cover onto the cover spool. Likewise, the cover can be unwound from the cover assembly in reverse manner thereby installing the cover onto a vehicle. Importantly, the cover roller assembly is portable and can be utilized on different vehicles. The cover roller assembly is easily adaptable to a wide range of vehicles.

While in accordance with the patent statutes, the best mode and preferred embodiment have been set forth, the scope of the invention is not limited thereto, but rather by the scope of the attached claims.

What is claimed is:

1. An automobile cover roller assembly, comprising:
a hand crank having a body operatively connectable to a cover spool, the hand crank having a jointed handle assembly moveable between a first, active position whereby the handle assembly can be utilized to rotate the cover spool in relation to a stabilizer support of the hand crank and a second, storage position wherein a portion of the handle assembly is stored inside the body.

2. The automobile cover roller assembly according to claim 1, wherein the hand crank stabilizer support comprises a support portal, and wherein the body is operatively connected to the support portal such that the body is rotatable in relation to the stabilizer support.

3. The automobile cover roller assembly according to claim 2, wherein the support portal has an inner diameter that is larger than an outer diameter of a portion of the body that extends through the support portal.

4. The automobile cover roller assembly according to claim 3, wherein the stabilizer support further includes a hand grip and the handle assembly includes a handle, wherein the handle can be rotated when in the active position to rotate the body in relation to the support portal.

5. The automobile cover roller assembly according to claim 2, wherein the handle assembly includes a plurality of handle segments that form two jointed segments in the active position.

6. The automobile cover assembly according to claim 5, wherein the handle assembly includes an intermediate handle segment having a slot at each end thereof, wherein a pin of an inner handle segment extends through one of the slots and the intermediate handle segment has an aperture through which the end of the inner handle segment can be extended, and wherein an outer handle segment has an aperture through which the other end of the intermediate handle segment can be extended.

7. The automobile cover assembly according to claim 2, wherein the handle assembly includes a handle segment having a drive collar that mates which an end of the body such that the handle assembly is able to rotate the body.

8. The automobile cover assembly according to claim 7, wherein the body includes an end threadably connectable to the cover spool.

9. An automobile cover roller assembly, comprising:
a cover spool having a segment adapted to be connected to a car cover and a connector member; and
a hand crank having a connector member adapted to be connected to the cover spool connector member, the hand crank including a hand crank stabilizer support, a body and a handle assembly operatively connected to the body such that the handle assembly can be used to rotate the cover spool in relation to the body, the handle assembly including at least one hinged section moveable in relation to the body such that a portion of the handle assembly can be stored in the body when not in use, wherein the hand crank stabilizer support comprises a support portal, and wherein the body is operatively connected to the support portal such that the body is rotatable in relation to the stabilizer support.

10. The automobile cover roller assembly according to claim 9, wherein the handle assembly includes a plurality of handle segments that form two jointed segments in the active position.

11. The automobile cover roller assembly according to claim 10, wherein the handle assembly includes an intermediate handle segment having a slot at each end thereof, wherein a pin of an inner handle segment extends through one of the slots and the intermediate handle segment has an aperture through which the end of the inner handle segment can be extended, and wherein an outer handle segment has an aperture through which the other end of the intermediate handle segment can be extended.

12. The automobile cover roller assembly according to claim 11, wherein the handle assembly includes a handle segment having a drive collar that mates which an end of the body such that the handle assembly is able to rotate the body.

13. The automobile cover roller assembly according to claim 9, wherein the support portal has an inner diameter that is larger than an outer diameter of a portion of the body that extends through the support portal.

14. The automobile cover roller assembly according to claim 13, wherein the stabilizer support further includes a hand grip and the handle assembly includes a handle, wherein the handle can be rotated when in the active position to rotate the body in relation to the support portal.

15. A method for using the cover roller assembly according to claim 1, including the steps of:
manipulating the handle assembly from the second, storage position to the first, active position; and
using the hand crank to wind or unwind an automobile cover from the cover spool.

* * * * *